(12) United States Patent
Johnson, II et al.

(10) Patent No.: US 9,023,286 B2
(45) Date of Patent: May 5, 2015

(54) MTO REGENERATOR MULTI-PASS GRIDS

(75) Inventors: Richard A. Johnson, II, Algonquin, IL (US); Paolo Palmas, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 441 days.

(21) Appl. No.: 13/458,592

(22) Filed: Apr. 27, 2012

(65) Prior Publication Data

US 2013/0252799 A1    Sep. 26, 2013

Related U.S. Application Data

(60) Provisional application No. 61/614,580, filed on Mar. 23, 2012.

(51) Int. Cl.
*B01J 8/12* (2006.01)
*B01J 38/26* (2006.01)

(52) U.S. Cl.
CPC ........ *B01J 8/125* (2013.01); *B01J 2208/00938* (2013.01); *B01J 38/26* (2013.01); *B01J 2208/0084* (2013.01); *B01J 2208/00884* (2013.01)

(58) Field of Classification Search
CPC ........................................................ B01J 8/125
USPC ................................................. 422/144, 212
See application file for complete search history.

(56) References Cited

U.S. PATENT DOCUMENTS

| | | | |
|---|---|---|---|
| 2,494,337 A * | 1/1950 | Hemminger | 422/142 |
| 2,718,491 A * | 9/1955 | Green | 208/155 |
| 5,251,565 A * | 10/1993 | Phillips | 110/346 |
| 6,680,030 B2 | 1/2004 | Koebel et al. | |
| 6,740,227 B2 | 5/2004 | Hedrick | |
| 6,780,308 B1 | 8/2004 | Hedrick et al. | |
| 7,799,287 B2 | 9/2010 | Hedrick et al. | |
| 7,829,030 B2 * | 11/2010 | Beech et al. | 422/139 |

FOREIGN PATENT DOCUMENTS

| | | |
|---|---|---|
| EP | 1397467 B1 | 8/2006 |
| RU | 2156651 C2 | 9/2000 |

OTHER PUBLICATIONS

PCT International Preliminary Report on Patentability for PCT/US2013/029253 mailed Oct. 2, 2014.

* cited by examiner

*Primary Examiner* — Lessanework Seifu

(57) ABSTRACT

A process and device for the regeneration of catalyst is presented. The device includes a series of grids within a regeneration vessel, where each grid includes small openings for the passage of gas, and larger openings for the passage of catalyst. The grids span horizontally across the vessel, and are spaced vertically apart to create a flow of catalyst down through the regenerator.

13 Claims, 3 Drawing Sheets

MTO REGENERATOR MULTI-PASS GRIDS

CROSS-REFERENCE TO RELATED APPLICATION

This application claims benefit of U.S. Provisional Application No. 61/614,580 filed on Mar. 23, 2012, which is incorporated herein by reference in its entirety.

FIELD OF THE INVENTION

The present invention relates to processes and apparatuses for the regeneration of catalysts, where the catalysts are contacted with a regeneration gas. Specifically, this invention relates to designs to the internals to a regenerator to distribute and contact the regeneration gas with a solid.

BACKGROUND OF THE INVENTION

The regeneration of a catalyst entails contacting the catalyst with a regeneration gas. Typically, the regeneration process includes burning, or combusting, carbon deposits on the catalyst, or coke. The coke is combusted with a hot, but oxygen lean gas to regenerate the catalyst. The catalyst requires a sufficient residence time to flow through the regenerator and to enable sufficient time for combusting the coke on the catalyst.

The catalyst typically flows down through a regenerator as a fluidized bed, with the regeneration gas, or combustion gas, flowing upward through the catalyst bed to remove the coke on the catalyst.

The typical process often develops uneven combustion, and therefore uneven regeneration of the catalyst.

SUMMARY OF THE INVENTION

The present invention provides for a more efficient catalyst regenerator in a methanol to olefins reactor system. The regenerator continuously regenerates spent catalyst by combusting the coke formed during the MTO reaction process. The regenerator of the present invention includes a vessel having a catalyst inlet, a catalyst outlet, a gas inlet and a gas outlet. The vessel includes a plurality of multi-pass grids which are disposed within the vessel. Each grid is disposed in a horizontal orientation and spans the cross-section of the vessel, and the grids are spaced vertically within the vessel. Each grid comprises a plurality of small openings of sufficient size to allow gas to flow through the grids, but with the openings sufficiently small to prevent the flow of catalyst particles. The grids further include at least one large opening for allowing catalyst to flow downward from one grid to the next. The large openings are preferably offset relative to the large openings of neighboring grids to direct the catalyst to flow partially across the grids before flowing down to the next grid.

Other objects, advantages and applications of the present invention will become apparent to those skilled in the art from the following detailed description and drawings.

DETAILED DESCRIPTION OF THE INVENTION

Figure 1:
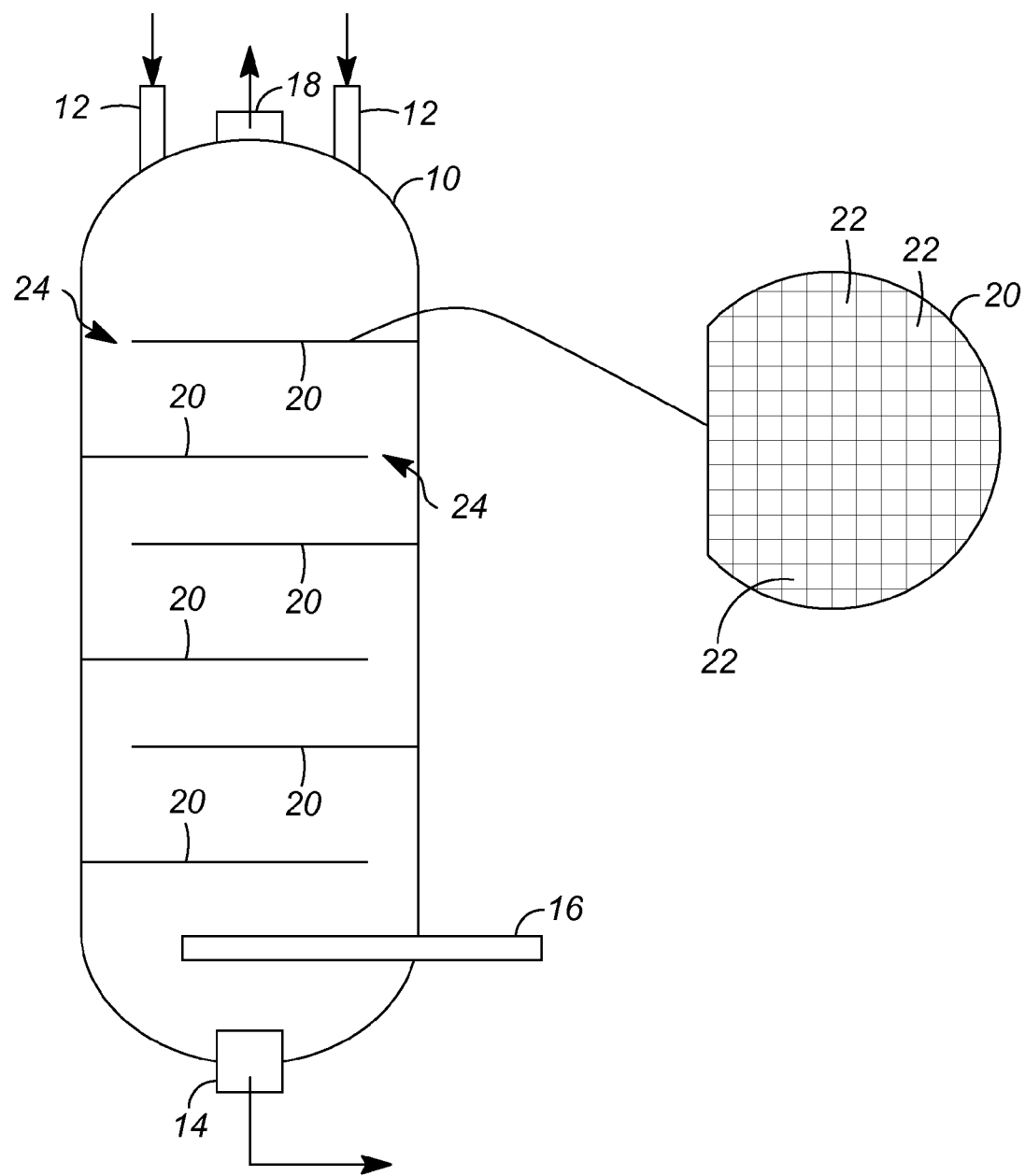
FIG. 1 is an embodiment of the regenerator with a first grid design and orientation.

A regenerator will comprise a vessel for catalyst to flow in a downward direction through the vessel, and have a hot gas flow upward over the catalyst, while burning off the coke from the catalyst. For some regenerators, the vessel requires a deep catalyst bed, such as is used in an MTO (methanol to olefins) catalyst regenerator. Deep catalyst beds are known to develop gas flow distribution problems. A deep bed can also develop large scale flows of particles in the fluidized bed, which can lead to segregated regions and to undesirable distributions of degrees of regeneration of the catalyst. The flow distribution of a gas in a deep bed has been studied and the gas bubbles have been found to coalesce to form larger gas bubbles. This creates regions of gas bubbles within a fluidized bed where there is a large amount of gas and little catalyst. This generates within the regenerator catalyst bed different densities, and affects the flow and circulation of catalyst, as well as contact time with the gas and residence time of the catalyst. One of the problems with such flow regimes is that the catalyst does not regenerate evenly, and reduces the carbon burning rate.

The present invention is a design for flowing the catalyst particles through the regenerator in a downward direction, while contacting an upward flowing combustion gas with the catalyst. The gas flow is sufficient to fluidize the catalyst particles, while contacting and combusting the coke on the particles. The catalyst particles flow across and down through a series of grids to maintain a distribution of the catalyst particles. The grids provide for flowing the catalyst particles and preventing the coalescence of air bubbles in the fluidized bed.

The grids extend horizontally across the regenerator cross-section, and each grid has a plurality of small openings for the flow of gas through the grids. The small openings are of a sufficiently small size to prevent the passage of catalyst particles. The grids can include a large opening for the passage of the catalyst particles or can extend across a portion of the regenerator cross-section with an opening or space between a section of the grid and the wall of the regenerator. The open area of the large opening, or the space between the end of a grid and the regenerator wall is sized to accommodate the flow of catalyst particles.

The grids prevent mal-distribution of the gas by distributing the flow across the horizontal cross-section of the vessel with flow up through the grids to contact the catalyst particles. This prevents high density regions of catalyst, thus providing for better gas contact with the catalyst. The grids provide for the ability of the catalyst to move up and down the regenerator, without developing substantially segregated volumes of catalyst that can either reside in the regenerator for too long a time, or to pass through the regenerator in too short of a time.

The grids need to occupy a sufficient percentage of the cross-sectional area of the regenerator to maintain adequate strength of the grids holding catalyst weight, but also to be sufficiently open for the gas to flow and fluidize the catalyst, as well as allowing catalyst to flow downward through the regenerator.

The catalyst regenerator includes a vessel 10 as shown in FIG. 1. The vessel 10 includes at least one catalyst inlet port 12 for admitting a catalyst to be regenerated, and at least one catalyst outlet port 14 for removing regenerated catalyst. The vessel 10 includes at least one gas inlet port 16 for admitting a combustion gas, and at least one gas outlet port 18 for venting combustion gas products. The regenerator includes a plurality of grids 20 disposed within the vessel 10 and where each grid 20 is disposed in a substantially horizontal orientation, spanning all or a portion of the vessel 10 cross-section. Each grid 20 includes a plurality of openings 22. The openings 22 are sized to allow substantially free flow of gas through the grid 20, while limiting the amount of catalyst particles to pass through the grid 20. In the embodiment in FIG. 1, each grid 20 spans a portion of the cross-section with an open area 24 at the end of the grid 20 between the grid 20 and the vessel wall. For this embodiment, the catalyst is fluidized by the regeneration gas, and flows across a grid 20, and down to a grid 20 disposed beneath it, with the catalyst continuing a flow back and forth across the vessel 10. In one alternative, the openings 22 can be sufficiently small to allow the gas to flow up while preventing the catalyst particles to flow down through the openings 22, forcing the catalyst to flow down the open areas 24. The open areas 24 preferably have a width of at least 2 cm, and more preferably have a width of at least 5 cm., with the open areas 24 defining large openings.

Figure 2:
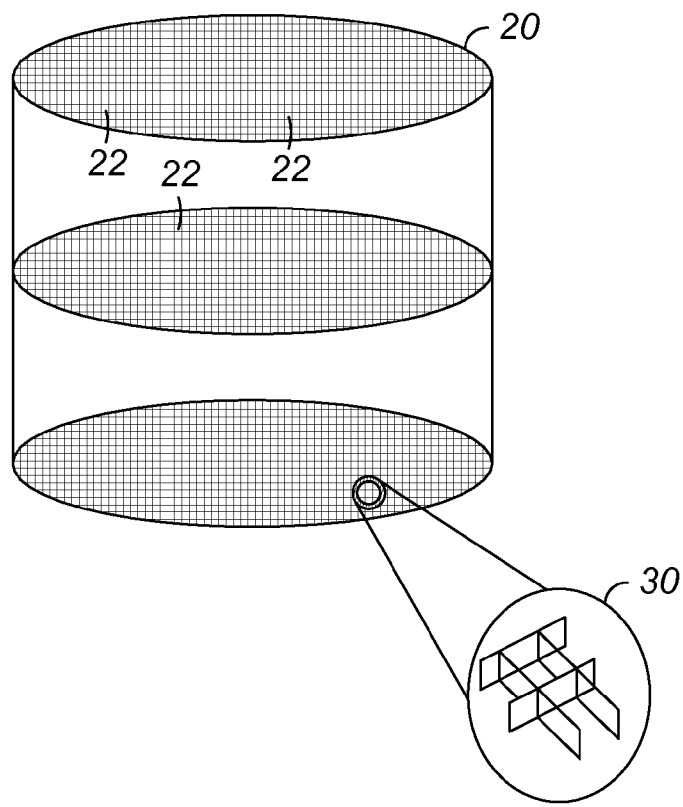
FIG. 2 is one embodiment of the regenerator, with a view of one grid orientation that spans the cross-section of the regenerator.

In one embodiment, the regenerator includes a vessel having at least one catalyst inlet, at least one gas inlet, at least one catalyst outlet, and at least one gas outlet. The vessel includes a plurality of grids 20, as shown in FIG. 2, with the grids disposed in a horizontal orientation within the vessel, and spanning across the vessel's cross-section. Each grid 20 includes a plurality of small openings 22 across the face of each grid 20. The grid can comprise a solid sheet of metal with appropriately sized holes 22, or can comprise a lattice formation of intersecting strips of metal as shown by 30. The openings 22 in the grids will preferably have an open area of at least 9 cm$^2$.

Figure 3:
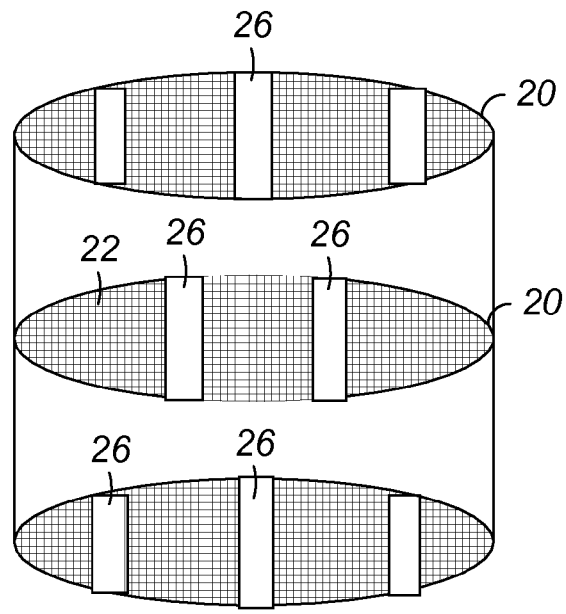
FIG. 3 is another embodiment with a second grid orientation that spans the cross-section of the regenerator with the large openings.

Another variation of this design is shown in FIG. 3, with the grids, as shown in FIG. 2, but with the additional feature of larger openings 26 within the grids 20. The larger openings 26 allow for significant flow of catalyst downward from one grid to another, while allowing fluidizing gas up through the smaller openings 22. When the design includes the large openings 26, the smaller openings can be sized to limit or restrict the bulk flow and allow the flow of catalyst through the small openings, or can have open areas of less than the size for allowing particles to flow through. By restricting the bulk flow of particles in a fluidized state to the larger openings maintains a continuous flow of the catalyst while limiting large scale flows that can cause segregation. The grids 20 are horizontally oriented, with a vertical spacing between neighboring grids 20.

The large openings 26 within a grid have a generally rectangular shape, with the length equal to a chord length across a grid, and a width of at least 1 cm, with the width preferably at least 2 cm, and in the range of 2 to 5 cm. The large openings 26 do not have to span the entire chord length of the grids, but preferably have a length of at least 5 cm, with a preferred length of at least 10 cm.

The position of the large openings 26 within a grid 20 are offset in the horizontal direction relative to the neighboring grids 20. As an example, a set of grids can be divided into two classes, a first class with 3 large openings, and a second class with 2 large openings. The first class might have the openings spaces a positions ⅙ of the diameter, ½ of the diameter, and ⅚ of the diameter. The second class might have the openings at ⅓ of the diameter, and ⅔ of the diameter. The grids are then alternated from each class as they are positioned within the vessel, and as can be seen in FIG. 3.

Other orientations can be envisioned, and FIG. 3 is merely one design, but the offset of the large openings 26 prevents the large scale flow of catalyst, and breaks up bubbles of gas within the regenerator.

The large openings 26 are positioned such that the openings are perpendicular to a diameter of the grid 20, and have a substantial orientation along a chord of the grid 20 that is perpendicular to the diameter. The large openings 26 can be substantially rectangular in shape, or substantially trapezoidal in shape to account for the curvature of the grid and vessel as the large opening intersects with the wall of the vessel, or the edge of the grid 20. The large openings have a width of at least 2 cm, and preferably at least 5 cm, with a length of at least 5 cm, and preferably at least 10 cm, providing open areas of the large openings 26 with at least 10 cm$^2$ and preferably at least 50 cm$^2$.

Figure 4:
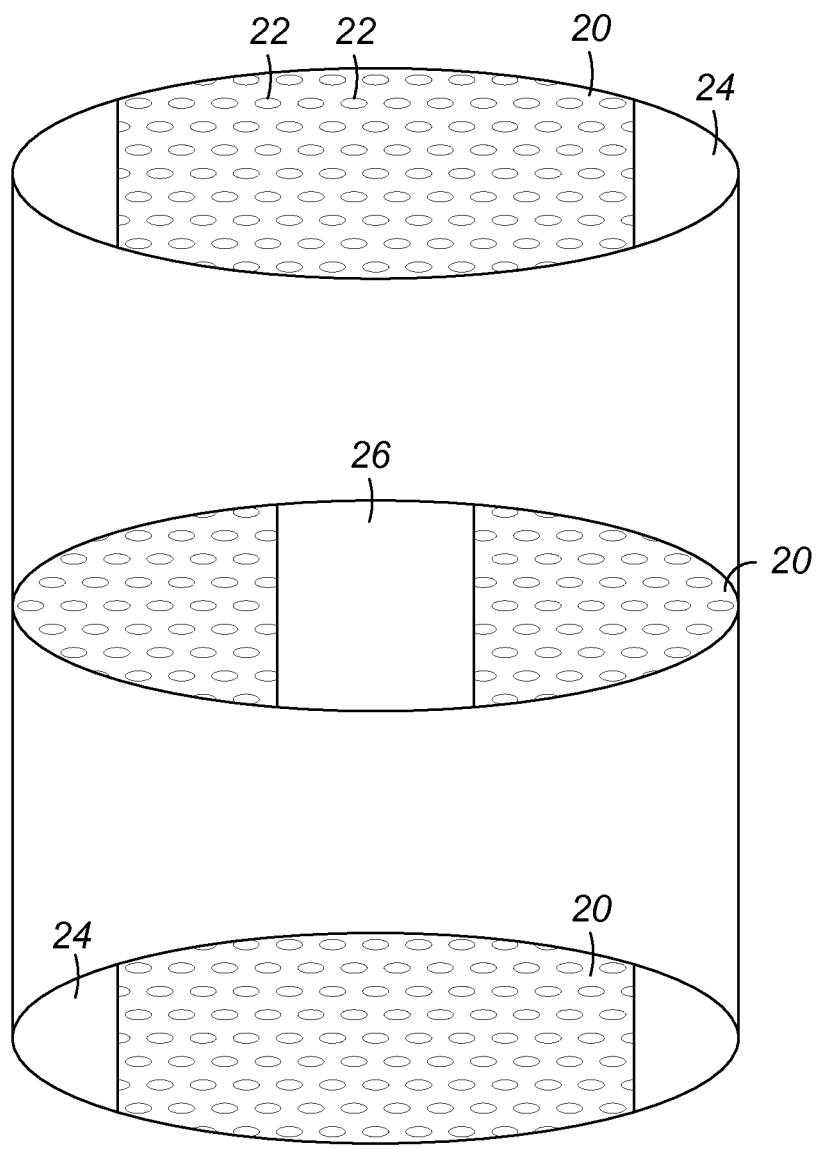
FIG. 4 is another embodiment of the grid design for the regenerator.

Another embodiment is shown in FIG. 4, where the grids 20 comprise two classes of grids. The first class includes grids that have small openings 22 within the grid, and on opposite sides include open spaces 24 for the flow of catalyst downward. The second class includes grids 20 that have small openings 22 throughout the grid 20, with a large opening 26 in a central location on the grid 20. The large opening 26 can span the entire width of the grid 20 or a smaller fraction of the width of the grid 20. The grids 20 are disposed within the vessel in an alternating pattern with a grid from the first class followed by a grid from the second class, and then repeating the pattern of first, second, etc.

The present invention comprises an apparatus for contacting a particulate matter with a hot gas, wherein the particulate matter has coke deposited on the particles. The hot gas comprising a controlled amount of oxygen for the controlled combustion of the coke to remove the coke from the particles. The apparatus includes a vessel having at least one port defined by the vessel for receiving particles that contain coke deposited thereon and at least one port for withdrawing combustion gases generated by the burning of the coke. The apparatus further includes a plurality of perforated plates where the plates are oriented horizontally within the vessel, and the plates are space apart from each other in the vertical direction. Each plate includes a perforated section and a grate section. The perforated section comprises a section with a plurality of holes to allow the flow of gas. The grate section can include some small holes, but includes at least one larger opening, where the large opening is of sufficient size to accommodate the flow of particles. The plates can include more than one grate section, and more than one perforated section.

The grate section includes the larger opening with an open area of at least 9 cm$^2$, and can have a generally rectangular shape. Preferably the large opening in the grate section has a width of at least 2 cm, and preferably the large opening in the grate section has a length of at least 5 cm.

The disposition of the plates in the vessel are distributed such that the large openings in one plate are displaced in the horizontal direction relative to the large openings in neighboring plates.

The regeneration process includes passing a stream of spent catalyst particles to a regenerator. The spent catalyst particles typically have coke deposited on the catalyst particles that blocks the active sites. The coke is burned off and the particles regenerated. A regeneration, or combustion, gas is passed to the regenerator and contacted with the catalyst particles within the regenerator. The gas flows to the regenerator in an amount sufficient to fluidize the catalyst to form a fluidized bed with the catalyst and gas circulating during the combustion process. The circulation and the flow of gas can lead to segregation and to larger gas bubbles within the regenerator. The regenerator has a deep bed for sufficient residence time to burn off the coke. As such, the regenerator is fitted with internal components, or grids, to control the flow of fluidized particles and the flow of gas to provide a more uniform operating density of particles and gas.

The catalyst particles flow down through the regenerator, wherein the flow includes directing the particles across grids and through large openings within the grids. The grids include small openings to accommodate the flow of regeneration gas up through the vessel, to fluidize the particles, and to burn the coke from the particles. The particles flow across and down over a plurality of grids and after combustion form a regenerated catalyst stream. The regenerated catalyst stream flows out of the regenerator bottoms, and is directed to a reactor within a process system. In particular to an MTO reactor. The combustion gas flows upward through the vessel and out a combusted gas port.

The multi-pass grids, or plates, within the regenerator vessel include large openings. The openings can be rectangular or circular and are distributed at various locations in a grid. The grids are disposed in a horizontal orientation with the large openings displaced in the horizontal direction relative to neighboring grids. This allows the catalyst to flow up and down the regenerator, but limits large scale circulation and segregation of the catalyst, and of the catalyst and regeneration gas. The multi-pass grids include small openings for the flow of gas to fluidize the particles within the regenerator.

By controlling the flow of catalyst through the regenerator, to provide a more uniform residence time of the catalyst within the regenerator, the gas-catalyst mixing is improved, and the overall catalyst residence time can be reduced. This allows for a smaller regenerator vessel and a smaller inventory of catalyst, thereby saving substantial cost to the MTO process.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A catalyst regenerator comprising:
   a vessel having a catalyst inlet, a catalyst outlet, a gas inlet and a gas outlet;
   a plurality of grids disposed within the vessel and extend horizontally across the vessel, and with a vertical spacing between pairs of grids, wherein each grid has an upper surface defined by the top of the grid and a lower surface defined by the bottom of the grid, wherein each grid comprises:
   a plurality of small openings of sufficient size to allow gas through, but small enough to prevent the passage of catalyst particles, and at least one large opening for allowing catalyst to flow through the grid, wherein each grid does not have a lip or rim extending vertically either above the upper surface or below the lower surface around the large opening.

2. The regenerator of claim 1 wherein the grids have a horizontal orientation and where neighboring grids have large openings offset in the horizontal direction relative to the large openings of neighboring grids.

3. The regenerator of claim 1 wherein the large openings are substantially rectangular, and span across the grid, and have an opening width between 2 and 5 cm.

4. The regenerator of claim 1 wherein each grid comprises a plate with small openings distributed over the plate, and each grid spans the horizontal cross-section of the vessel and has an end that is spaced at least 2 cm from one side of the vessel, wherein the space between the vessel wall and the grid defines the large opening.

5. The regenerator of claim 4 wherein alternating grids have the space between the grid and vessel wall on opposite sides of the vessel.

6. A catalyst regenerator comprising
   a vessel having a catalyst inlet for admitting catalyst particles, a catalyst outlet for withdrawing catalyst particles, a gas inlet and a gas outlet;
   a plurality of grids disposed within the vessel and extend horizontally across the vessel, and with a vertical spacing between pairs of grids, wherein each grid comprises:
   a plurality of small openings, and at least one large opening for allowing catalyst to flow through the grid, wherein the small openings are sized to allow catalyst particles to flow through but restrict the general bulk catalyst flow, and wherein the large openings are sized to allow larger flows of catalyst particles; and
   wherein the grids comprise at least two large openings per grid.

7. The catalyst regenerator of claim 6 wherein the large openings in the grids are in offset horizontal positions relative to the nearest neighbor grids in the vessel.

8. The catalyst regenerator of claim 6 wherein the large openings have a width of at least 2 cm, and the length is equal to the chord length of the gird.

9. An apparatus for the regeneration of particulate material having coke deposited thereon, the apparatus comprising:
   a vessel having at least one port defined by the vessel for receiving particles that contain coke deposited thereon and at least one port for withdrawing combustion gases generated by the burning of the coke; and
   a plurality of perforated plates spaced apart vertically over at least a portion of the vessel height with each plate comprising a perforated section and a grate section, wherein the plate extends substantially over an entire horizontal, cross-sectional area of the vessel;
   wherein the perforated section comprises a plurality of holes to pass a vapor phase and where the holes are sufficiently small to prevent the passage of the particulate material, and wherein the grate section comprises at least one opening of sufficient size for passage of the particulate material, and wherein each grid comprises a substantially planar structure without a rim on the grate section that extends vertically either above or below the plate.

10. The apparatus of claim 9 wherein the at least one opening in the grate section is at least 0.09 m$^2$.

11. The apparatus of claim 9 wherein the at least one opening in the grate section is a rectangular opening having a width of at least 2 cm.

12. The apparatus of claim 11 wherein the at least one opening in the grate section has a length of at least 5 cm.

13. The apparatus of claim 9 wherein the grate section of one plate is displaced in the horizontal direction relative to a neighboring plate.

* * * * *